(12) United States Patent
Saw et al.

(10) Patent No.: US 8,425,113 B2
(45) Date of Patent: Apr. 23, 2013

(54) SYSTEM AND METHOD FOR REMOTE TEMPERATURE SENSING

(75) Inventors: Sooping Saw, The Colony, TX (US); Alphonse Chesneau, Coppell, TX (US)

(73) Assignee: STMicroelectronics, Inc., Coppell, TX (US)

( * ) Notice: Subject to any disclaimer, the term of this patent is extended or adjusted under 35 U.S.C. 154(b) by 575 days.

(21) Appl. No.: 12/592,739

(22) Filed: Dec. 2, 2009

(65) Prior Publication Data

US 2010/0166036 A1    Jul. 1, 2010

Related U.S. Application Data

(60) Provisional application No. 61/204,091, filed on Dec. 31, 2008.

(51) Int. Cl.
*G01K 7/00* (2006.01)

(52) U.S. Cl.
USPC .......................... 374/178; 374/170; 374/112

(58) Field of Classification Search .................. 374/178, 374/170, 112
See application file for complete search history.

(56) References Cited

U.S. PATENT DOCUMENTS

| 6,480,127 | B1* | 11/2002 | Aslan | 341/119 |
|---|---|---|---|---|
| 6,957,910 | B1* | 10/2005 | Wan et al. | 374/183 |
| 7,033,072 | B2* | 4/2006 | Aota et al. | 374/178 |
| 2007/0091979 | A1* | 4/2007 | Chiu | 374/1 |
| 2008/0165826 | A1* | 7/2008 | Cheng et al. | 374/178 |

* cited by examiner

*Primary Examiner* — Mirellys Jagan
(74) *Attorney, Agent, or Firm* — Munck Wilson Mandala, LLP

(57) ABSTRACT

An apparatus and method are disclosed for temperature measurement that includes performing a first ΔVbe measurement of a first temperature of a diode circuit comprising a transistor and, subsequently, performing a first Vbe measurement of a second temperature of the diode circuit. A temperature difference is calculated between the second temperature and the first temperature. If the temperature difference is not greater than a predetermined amount, a second Vbe measurement of a third temperature of the diode circuit is subsequently performed. If the temperature difference is greater than the predetermined amount, a second ΔVbe measurement of the second temperature of the diode circuit is performed.

20 Claims, 3 Drawing Sheets

SYSTEM AND METHOD FOR REMOTE TEMPERATURE SENSING

CROSS-REFERENCE TO RELATED APPLICATION AND CLAIM OF PRIORITY

The present application is related to U.S. Provisional Patent No. 61/204,091, filed Dec. 31, 2008, entitled "SYSTEM AND METHOD FOR REMOTE TEMPERATURE MEASUREMENT". U.S. Provisional Patent No. 61/204,091 is assigned to the assignee of the present application and is hereby incorporated by reference into the present disclosure as if fully set forth herein. The present application hereby claims priority under 35 U.S.C. §119(e) to U.S. Provisional Patent No. 61/204,091.

TECHNICAL FIELD

The present disclosure relates generally to temperature measurement systems, and in particular to a system and a method for measuring the temperature of a bipolar transistor.

BACKGROUND

A first prior art method for measuring a temperature of a bipolar transistor uses a measured value of a base to emitter voltage (Vbe) of the bipolar transistor. This first prior art method is referred to as the Vbe method. A second prior art method uses a measured value of a change in the base to emitter voltage ($\Delta$Vbe) of the bipolar transistor between two values of injected bias current to measure the temperature of the bipolar transistor. This second prior art method is referred to as the $\Delta$Vbe method.

Many remote temperature sensors that are now marketed use the $\Delta$Vbe method to remotely sense the temperature of the bipolar transistor. These prior art sensing devices determine the values of two Vbe measurements serially. That is, a first measurement of Vbe is made and then later a second measurement of Vbe is made. Then one of the two measurements is subtracted from the other to obtain the $\Delta$Vbe value which may be translated into an absolute temperature value for the bipolar transistor.

The temperature characteristic of the Vbe at a fixed value of current may be process dependent or device dependent. This means that the Vbe voltage measured across a bipolar transistor at a particular absolute temperature may vary between bipolar transistors made in different fabrication processes or even between bipolar transistors made in the same fabrication process. However, the Vbe voltage can be accurately used to monitor the relative change of temperature in a small temperature range regardless of the process/device sensitivity. In prior art remote temperature sensing, both the Vbe at low current values and the Vbe at high current values are measured in order to calculate the absolute temperature of the bipolar transistor.

SUMMARY

Embodiments of the present disclosure generally provide a system and method for remote temperature sensing.

In one embodiment, the present disclosure provides a method of temperature measurement that includes performing a first $\Delta$Vbe measurement of a first temperature of a diode circuit comprising a transistor and, subsequently, performing a first Vbe measurement of a second temperature of the diode circuit. The method also includes calculating a temperature difference between the second temperature and the first temperature. If the temperature difference is not greater than a predetermined amount, the method further includes subsequently performing a second Vbe measurement of a third temperature of the diode circuit. If the temperature difference is greater than the predetermined amount, the method further includes performing a second $\Delta$Vbe measurement of the second temperature of the diode circuit.

In another embodiment, the present disclosure provides an apparatus that includes a diode circuit comprising a transistor, a current injection unit coupled to the transistor, and a measurement controller coupled to the current injection unit and the diode circuit. The measurement controller is adapted to perform a first $\Delta$Vbe measurement of a first temperature of the diode circuit and, subsequently, perform a first Vbe measurement of a second temperature of the diode circuit. The measurement controller is also adapted to calculate a temperature difference between the second temperature and the first temperature.

If the temperature difference is not greater than a predetermined amount, the measurement controller is further adapted to subsequently perform a second Vbe measurement of a third temperature of the diode circuit. If the temperature difference is greater than the predetermined amount, the measurement controller is further adapted to perform a second $\Delta$Vbe measurement of the second temperature of the diode circuit.

In yet another embodiment, the present disclosure provides a system that includes a subsystem, a diode circuit comprising a transistor thermally coupled to the subsystem, a measurement system electrically coupled to the diode circuit; and a controller communicatively coupled to the measurement system. The measurement system is adapted to perform a first $\Delta$Vbe measurement of a first temperature of the diode circuit and communicate to the controller a first measured temperature based upon the first $\Delta$Vbe measurement. The measurement system is also adapted to, subsequently, perform a first Vbe measurement of a second temperature of the diode circuit and calculate a temperature difference between the second temperature and the first temperature.

If the temperature difference is not greater than a predetermined amount, the measurement system is also adapted to subsequently perform a second Vbe measurement of a third temperature of the diode circuit. If the temperature difference is greater than the predetermined amount, the measurement system is also adapted to perform a second $\Delta$Vbe measurement of the second temperature of the diode circuit and communicate to the controller a second measured temperature based upon the second $\Delta$Vbe measurement.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure presents a method and system for remote sensing of a temperature of a bipolar transistor. The method and system provide temperature sensing with reduced power consumption.

Figure 1A:
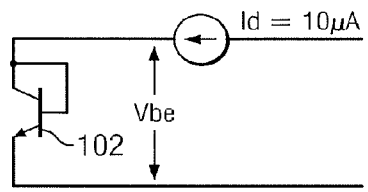
FIG. 1A is a schematic diagram of an exemplary prior art bipolar transistor illustrating how the base to emitter voltage (Vbe) of the bipolar transistor is measured.
Figure 1B:
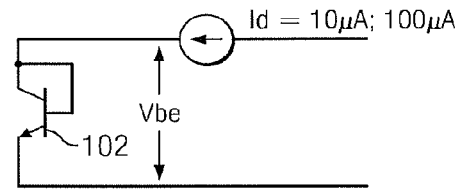
FIG. 1B is a schematic diagram of an exemplary prior art bipolar transistor illustrating how a change in the base to emitter voltage ($\Delta$Vbe) of the bipolar transistor between two values of injected bias current is measured.

FIG. 1A and FIG. 1B illustrate a temperature characteristic of bipolar junction voltage. A bipolar transistor 102, illustrated in FIG. 1A, is configured as a diode circuit by connecting a base of the bipolar transistor 102 to a collector of the bipolar transistor 102. This causes the base and collector to be at the same voltage level. The voltage across the diode configuration of the bipolar transistor 102 (or the diode circuit 102) is given by a voltage between the base and an emitter of the bipolar transistor 102. This voltage is represented by the term Vbe.

As shown in FIG. 1A, a bias current Id may be injected into the diode circuit 102 having a value of ten microamperes (10 µA). A value of the Vbe voltage is then measured. A first prior art method uses the measured value of the base to emitter voltage (Vbe) of the bipolar transistor 102 configured as a diode to measure a temperature of the bipolar transistor. The Vbe value is subsequently translated into an absolute temperature value for the bipolar transistor. Typically, the value of Vbe is complementary to absolute temperature and may have a sensitivity of approximately −2 millivolts per degree Celsius (mV/° c.). This first prior art method may be referred to as the Vbe method.

FIG. 1B is a schematic diagram of an exemplary prior art bipolar transistor illustrating how a change in the base to emitter voltage (ΔVbe) of the bipolar transistor between two values of injected bias current may be measured to determine absolute temperature. The bipolar transistor 102 in FIG. 1B is configured as a diode circuit by connecting the base to the collector of the bipolar transistor 102. This causes the base and collector to be at the same voltage level. A voltage across the diode configuration of the bipolar transistor 102 is given by the voltage between the base and the emitter. This voltage is represented by the term Vbe.

As shown in FIG. 1B, a value of bias current Id that is first injected into the diode has a typical high value of one hundred microamperes (100 µA). A first value of the Vbe voltage is measured when the value of the bias current has the high 100 µA value. Then a second value of bias current Id is injected into the diode. The second value has a typical low value of ten microamperes (10 µA). A second value of the Vbe voltage is measured when the value of the bias current Id has the low 10 µA value. Then the second value of the Vbe voltage is subtracted from the first value of the Vbe voltage to give a difference between the two values. The difference between the two values is represented by the term ΔVbe.

A second prior art method uses the measured value of the difference (ΔVbe) of between the two values of base to emitter voltage (Vbe) of the bipolar transistor 102 configured as a diode to measure the temperature of the bipolar transistor 102. The ΔVbe value is subsequently translated into an absolute temperature value for the bipolar transistor 102. Typically, the value of ΔVbe is proportional to absolute temperature and may have a sensitivity of approximately 200 microvolts per degree Celsius (µV/° c.). This second prior art method is referred to as the ΔVbe method.

Figure 2:
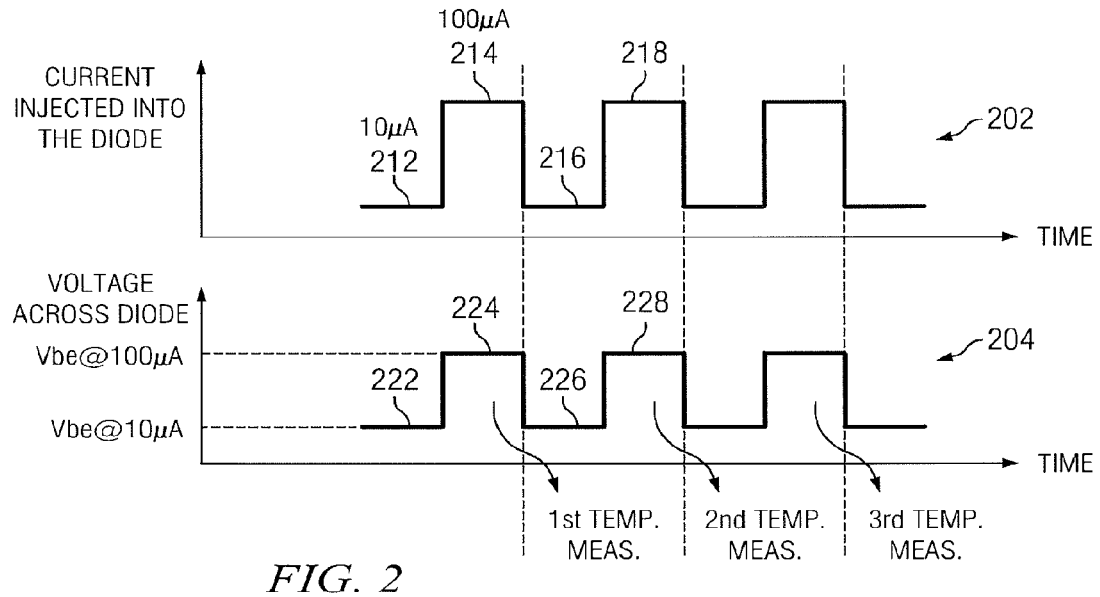
FIG. 2 presents (1) a graph of current injected into a bipolar transistor configured as a diode versus time and (2) a graph of voltage across the diode versus time illustrating a prior art method for measuring the temperature of the bipolar transistor.

FIG. 2 presents (1) a graph 202 of current injected into the bipolar transistor 102 configured as a diode (the diode circuit 102) versus time and (2) a graph 204 of voltage across the diode circuit 102 versus time illustrating the second prior art method for measuring the temperature of the bipolar transistor (the ΔVbe method). As shown in FIG. 2, a first value 212 of current is injected into the diode circuit 102 at the low value of ten microamperes (10 µA). A resulting first voltage 222 across the diode circuit 102 is represented by the term Vbe@10 µA. At a later time a second value 214 of current is injected into the diode circuit 102 at the high value of one hundred microamperes (100 µA). A resulting second voltage 224 across the diode circuit 102 is represented by the term Vbe@100 µA.

The first level 212 of the low value of injected current of 10 µA that is first injected is shown in the top graph of FIG. 2. The resulting first level 222 of the low voltage across the diode (Vbe@10 µA) is shown in the bottom graph of FIG. 2. The second level 214 of the high value of current of injected current of 100 µA that is subsequently injected into the diode circuit is also shown in the top graph of FIG. 2. The resulting second level 224 of the high voltage across the diode (Vbe@100 µA) is shown in the bottom graph of FIG. 2.

The prior art ΔVbe method subtracts the first value 222 of the Vbe@10 µA voltage from the second value 224 of the Vbe@100 µA voltage to obtain a first difference value (first ΔVbe value). The first difference value of the ΔVbe voltage is then translated into a first value of absolute temperature for the bipolar transistor. This process is schematically represented by the arrow in FIG. 2 that points to the text that reads "$1^{st}$ Temp. Meas." The time to perform a single ΔVbe measurement is typically less than one hundred milliseconds (100 ms).

The process of the ΔVbe voltage method that has been described is then repeated. A third current 216 is injected into the diode circuit 102, having a value of ten microamperes (10 µA), and a third voltage 226 (Vbe@10 µA) across the diode circuit 102 is obtained. Then a fourth current 218 is injected into the diode circuit 102, having a value of one hundred microamperes (100 µA), and a fourth voltage 228 (Vbe@100 µA) across the diode circuit 102 is obtained. A second difference value between the third voltage and the fourth voltage (second ΔVbe value) is obtained and translated into a second value of absolute temperature for the bipolar transistor 102. This second iteration of the process is schematically represented by the arrow in FIG. 2 that points to the text that reads "$2^{nd}$ Temp. Meas." Another subsequent iteration is represented by the arrow in FIG. 2 that points to the text that reads "$3^{rd}$ Temp. Meas."

Figure 3:
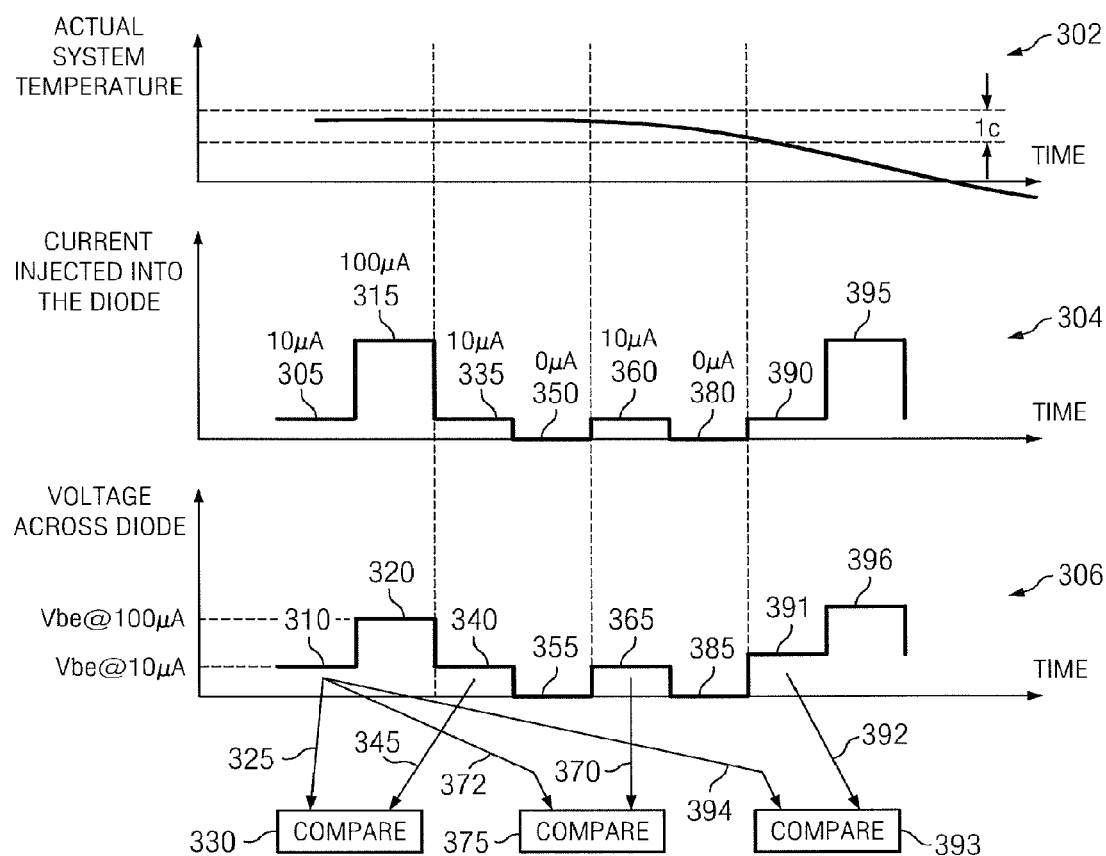
FIG. 3 presents (1) a graph of the actual system temperature versus time and (2) a graph of current injected into a bipolar transistor configured as a diode versus time and (3) a graph of voltage across the diode versus time illustrating an embodiment of the disclosure for measuring a temperature of the bipolar transistor.

FIG. 3 presents (1) a graph 302 of an actual system temperature versus time and (2) a graph 304 of current injected into a bipolar transistor 102 configured as a diode (the diode circuit 102) versus time and (3) a graph 306 of voltage across the diode circuit 102 versus time illustrating an advantageous embodiment of a method for measuring the temperature of the bipolar transistor 102.

As previously described, a prior art method uses first and second measured values of Vbe of the bipolar transistor 102 at first and second currents, respectively, in two complete, successive measurements to determine whether an absolute temperature of the bipolar transistor 102 has changed. In most practical temperature monitoring systems, however, the temperature does not change rapidly. Furthermore, if the system is in an idle state, the temperature may not be changing substantially.

Embodiments of the present disclosure make use of both the Vbe measurement technique and the ΔVbe measurement technique to monitor both relative temperature changes and absolute temperature, respectively. The relative temperature difference at two consecutive measurements is used to determine if an absolute temperature measurement is necessary.

As shown in FIG. 3, a first value of current 305 is injected into the diode circuit 102, having a low value of ten microamperes (10 μA). A resulting first voltage 310 across the diode circuit 102 is represented by the term Vbe@10 μA. At a later time, a second value of current 315 is injected into the diode circuit 102, having a high value of one hundred microamperes (100 μA). A resulting second voltage 320 across the diode circuit 102 is represented by the term Vbe@100 μA.

The first value 305 of injected current is shown in the middle graph 304 of FIG. 3. The resulting first level 310 of voltage across the diode circuit 102 (Vbe@10 μA) is shown in the bottom graph 306 of FIG. 3. The second value 315 of injected current is also shown in the middle graph 304 of FIG. 3. The resulting second level 320 across the diode circuit 102 (Vbe@100 μA) is also shown in the bottom graph 306 of FIG. 3.

The method of the present disclosure subtracts the first value 310 (Vbe@10 μA) from the second value 320 (Vbe@100 μA) to obtain a first voltage difference value (a first ΔVbe). The first voltage difference value is then translated into a first absolute temperature value for the bipolar transistor 102. This first absolute temperature value may be designated as Temperature Measurement One.

A next step of an embodiment of the disclosure then occurs. A third current 335 injected into the diode circuit 102 having a value of ten microamperes (10 μA) and a third voltage 340 (Vbe@10 μA) across the diode circuit 102 is obtained. Then the third voltage value 340 (Vbe@10 μA) across the diode circuit 102 is translated into a second absolute temperature value for the bipolar transistor 102. This second absolute temperature value is designated as Temperature Measurement Two.

A comparison of Temperature Measurement One and Temperature Measurement Two is made within box 330. The Temperature Measurement One is provided to the comparison box 330 as shown by arrow 325. The Temperature Measurement Two is provided to the comparison box 330 as shown by arrow 345. If a temperature difference between Temperature Measurement One and Temperature Measurement Two is less than one degree Celsius (1° C.), then a fourth value 350 of current having a value of zero microamperes (0 μA) is injected into the diode circuit 102. The value of injected current will not be set to a high value of one hundred microamperes (100 μA) for the purpose of making a ΔVbe measurement until a subsequently measured temperature difference between two values of Vbe@10 μA is greater than one degree Celsius (1° C.).

In other embodiments, a temperature difference between values of Vbe@10 μA of greater or less than one degree Celsius may be used to trigger another ΔVbe measurement. In still other embodiments a temperature scale other than Celsius may be used, such as Fahrenheit.

As shown in FIG. 3, when the fourth value 350 of injected current is zero, a resulting fourth value 355 of voltage across the diode circuit 102 is also zero. At a subsequent time, a fifth current 360 is injected into the diode circuit 102, having a value of ten microamperes (10 μA) and a fifth voltage 365 (Vbe@10 μA) across the diode circuit 102 is obtained. The fifth voltage value 365 is translated into a third absolute temperature value for the bipolar transistor 102. This value of temperature is designated as Temperature Measurement Three.

A comparison of Temperature Measurement One and Temperature Measurement Three is made within box 375. The Temperature Measurement One is provided to the comparison box 375 as shown by arrow 372. The Temperature Measurement Three is provided to the comparison box 375 as shown by arrow 370. If a temperature difference between Temperature Measurement One and Temperature Measurement Three is less than one degree Celsius (1° C.), then a sixth value 380 of current, having a value of zero microamperes (0 μA), is injected into the diode circuit 102. Once again, the value of current injected into the diode circuit 102 will not be set to a high value of one hundred microamperes (100 μA) for the purpose of making a ΔVbe measurement until a subsequently measured temperature difference between two values of Vbe@10 μA is greater than one degree Celsius (1° C.).

As shown in FIG. 3, when the sixth value 380 of injected current is zero, a resulting value 385 of voltage across the diode circuit 102 is also zero. At a subsequent time, a seventh value 390 of current is injected into the diode 390, having a value of ten microamperes (10 μA) and a seventh voltage 391 (Vbe@10 μA) across the diode circuit 102 is obtained. The seventh voltage value 391 is translated into a fourth absolute temperature value for the bipolar transistor 102. This value of temperature is designated as Temperature Measurement Four.

A comparison of Temperature Measurement One and Temperature Measurement Four is made within box 393. The Temperature Measurement One is provided to the comparison box 393 as shown by arrow 394. The Temperature Measurement Four is provided to the comparison box 393 as shown by arrow 392. In this case, a temperature difference between Temperature Measurement One and Temperature Measurement Four is greater than one degree Celsius (1° C.). As a result, an eighth value 395 of current, having a value of one hundred microamperes (100 μA), is injected into the diode circuit 102. A resulting eighth voltage 396 (Vbe@100 μA) across the diode circuit 102 is obtained and a ΔVbe calculation may be performed on the seventh voltage value 391 and the eighth voltage value 396.

In this manner the system and method of the disclosure makes use of Vbe measurements to determine whether it is necessary to make a high current (100 μA) measurement and perform a ΔVbe calculation. Embodiments of the present disclosure may reduce power consumption by reducing a number of times that a high current (100 μA) Vbe measurement must be made. Embodiments of the present disclosure may further reduce power consumption performing only one analog to digital (A/D) conversion when the absolute temperature value of the bipolar transistor 102 has not changed by more that a predetermined amount.

Figure 4:
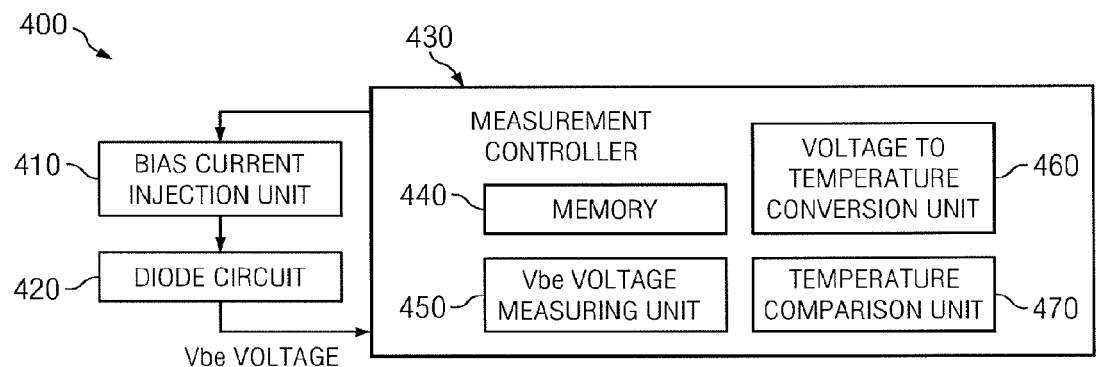
FIG. 4 is a block diagram of a measurement system according to an embodiment of the disclosure.

FIG. 4 is schematic diagram of a measurement system 400 according to the disclosure that includes a measurement controller 430 for measuring a temperature of a diode circuit 420. The diode circuit 420 receives selected values of bias current from a bias current injection unit 410 that is controlled by the measurement controller 430. The measurement controller 430 measures a base to emitter voltage (Vbe) of the diode circuit 420. In some embodiments, the diode circuit 420 is a bipolar transistor coupled in a diode configuration. In other embodiments, the transistor 420 is a common-collector PNP (such as a substrate PNP of a microprocessor) coupled in a diode configuration.

The measurement controller 430 includes a computer memory unit 440. The measurement controller 430 further includes a Vbe voltage measuring unit 450, a voltage to temperature conversion unit 460, and a temperature comparison unit 470. In some embodiments, the elements of the measurement controller 430 are implemented as hardware subsystems of the measurement controller 430. In other embodiments, the elements of the measurement controller 430 are implemented as software subroutines performed by the measurement controller 430.

The measurement controller 430 is operable to perform the actions described with reference to the embodiment of the disclosure shown in FIG. 3. That is, during a ΔVbe calculation, the measurement controller 430 is operable to cause the bias current injection unit 410 to inject a first bias current into the diode circuit 420, and the Vbe voltage measuring unit 450 is operable to measure a first Vbe across the diode circuit 420. The measurement controller 430 is then operable to cause the bias current injection unit 410 to inject a second bias current into the diode circuit 420, and the Vbe voltage measuring unit 450 is then operable to measure a second Vbe across the diode circuit 420. Using the first and second values of Vbe measured across the diode circuit 420, the voltage to temperature conversion unit 460 is operable to calculate the value of ΔVbe and convert the ΔVbe value to a first absolute temperature value of the diode circuit 420.

Subsequently, the measurement controller 430 is operable to cause the bias current injection unit 410 to inject a third bias current into the diode circuit 420 (typically equal to the first bias current), and the Vbe voltage measuring unit 450 is operable to measure a third Vbe across the diode circuit 420. The voltage to temperature conversion unit is operable to convert the third Vbe value to a second absolute temperature value. The temperature comparison unit 470 is operable to compare the first and second absolute temperature values to determine whether a temperature change of greater than one degree Celsius (or other desired amount) has occurred. If a temperature change greater than the predetermined amount has occurred, the measurement controller 430 is operable to proceed with another ΔVbe calculation, as described with reference to FIG. 3.

Figure 5:
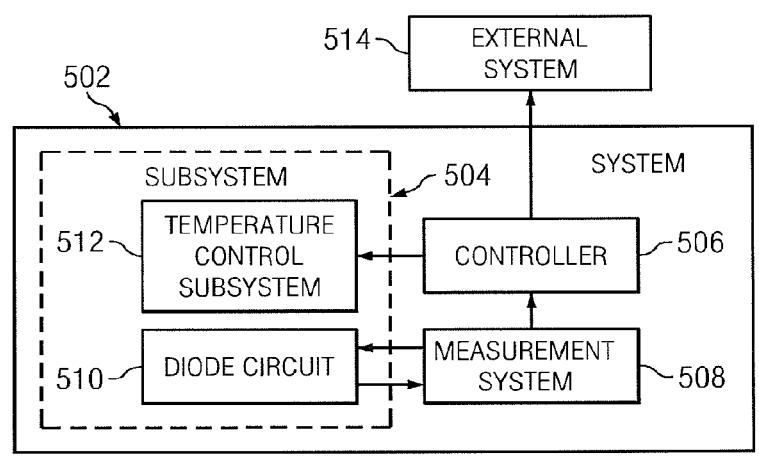
FIG. 5 is a block diagram of a system including a measurement system according to an embodiment of the disclosure.

FIG. 5 presents a block diagram of a system 502 including a measurement system 508 according to an embodiment of the disclosure. In some embodiments, the system 502 is a desktop computer, a notebook computer, or a server system. In other embodiments, the system 502 is a test and measurement system. In still other embodiments, the system 502 is a multichip module.

The system 502 includes a subsystem 504 whose temperature is of concern to a controller 506 of the system 502. In a computer or server, the subsystem 504 may be a circuit board or an integrated circuit. In a test and measurement system, the subsystem 504 may be a system under test. In a multichip module, the subsystem 504 may be one of the integrated circuits in the module.

The measurement system 508 is electrically coupled to a diode circuit 510, which is thermally coupled to the subsystem 504 such that a temperature of the diode circuit 510 varies with a temperature of the subsystem 504. In some embodiments, the diode circuit 510 is a standalone component in the subsystem 504. In other embodiments, the diode circuit 510 is fabricated within an integrated circuit of the subsystem 504. The measurement system 508 is operable according to the present disclosure to measure a temperature of the diode circuit 510.

The measurement system 508 is further operable to communicate a measured temperature of the diode circuit 510 to the controller 506. In some embodiments, the controller 506 is operable, in response to the measured temperature received from the measurement system 508, to cause a temperature control subsystem 512 to modify the temperature of the subsystem 504. In other embodiments, the controller is operable to communicate the measured temperature received from the measurement system 508 to an external system 514. The external system may be a data logging system keeping a historical record of measured temperatures, a maintenance scheduling system triggered by reported temperature, or other system that utilizes the measured temperature of the subsystem 504.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of temperature measurement, the method comprising:
    performing a first ΔVbe measurement of a first temperature of a diode circuit comprising a transistor;
    subsequently performing a first Vbe measurement of a second temperature of the diode circuit;
    calculating a temperature difference between the second temperature and the first temperature;
    if the temperature difference between the second temperature and the first temperature is not greater than a predetermined amount, subsequently and repeatedly performing a second Vbe measurement of a third temperature of the diode circuit for as long as a temperature difference between the third temperature and the first temperature is not greater than the predetermined amount;
    if the temperature difference between the second temperature and the first temperature is greater than the predetermined amount, performing a second ΔVbe measurement of the second temperature of the diode circuit; and
    when a temperature difference between the third temperature and the first temperature is greater than the predetermined amount, performing the second ΔVbe measurement of the third temperature of the diode circuit.

2. The method of claim 1, wherein the predetermined amount is one degree Celsius.

3. The method of claim 1, wherein performing the first ΔVbe measurement of the first temperature of the diode circuit comprising the transistor comprises:
   injecting a first value of current into the diode circuit;
   measuring a first voltage of the diode circuit resulting from the first value of current;
   injecting a second value of current into the diode circuit;
   measuring a second voltage of the diode circuit resulting from the second value of current;
   determining a value of the first ΔVbe measurement by calculating a voltage difference between the first voltage and the second voltage; and
   calculating a temperature of the diode circuit based upon the first voltage difference.

4. The method of claim 3, wherein the first value of current is ten microamperes (10 μA) and the second value of current is one hundred microamperes (100 μA).

5. The method of claim 3, wherein performing the Vbe measurement of the second temperature or of the third temperature of the diode circuit comprises:
   injecting a third value of current into the diode circuit;
   measuring a third voltage of the diode circuit resulting from the third value of current;
   when performing the Vbe measurement of the second temperature, calculating the second temperature of the diode circuit based upon the third voltage, and
   when performing the Vbe measurement of the third temperature, calculating the third temperature of the diode circuit based upon the third voltage.

6. The method of claim 5, wherein performing the second ΔVbe measurement of the second temperature or of the third temperature of the diode circuit comprises:
   injecting a fourth value of current into the diode circuit;
   measuring a fourth voltage of the diode circuit resulting from the fourth value of current;
   determining a value of the second ΔVbe measurement by calculating a voltage difference between the third voltage and the fourth voltage;
   when performing the ΔVbe measurement of the second temperature, calculating the second temperature of the diode circuit based upon the value of the second ΔVbe measurement, and
   when performing the ΔVbe measurement of the third temperature, calculating the third temperature of the diode circuit based upon the value of the second ΔVbe measurement.

7. The method of claim 6, wherein the third value of current is ten microamperes (10 μA) and the fourth value of current is one hundred microamperes (100 μA).

8. An apparatus, comprising:
   a diode circuit comprising a transistor;
   a current injection unit coupled to the transistor; and
   a measurement controller coupled to the current injection unit and the diode circuit, wherein the measurement controller is configured to:
      perform a first ΔVbe measurement of a first temperature of the diode circuit,
      subsequently perform a first Vbe measurement of a second temperature of the diode circuit,
      calculate a temperature difference between the second temperature and the first temperature,
      if the temperature difference between the second temperature and the first temperature is not greater than a predetermined amount, subsequently and repeatedly perform a second Vbe measurement of a third temperature of the diode circuit for as long as a temperature difference between the third temperature and the first temperature is not greater than the predetermined amount,
      if the temperature difference between the second temperature and the first temperature is greater than the predetermined amount, perform a second ΔVbe measurement of the second temperature of the diode circuit, and
      when a temperature difference between the third temperature and the first temperature is greater than the predetermined amount, perform the second ΔVbe measurement of the third temperature of the diode circuit.

9. The apparatus of claim 8, wherein the predetermined amount is one degree Celsius.

10. The apparatus of claim 8, wherein the measurement controller is further configured to perform the first ΔVbe measurement of the first temperature of the diode circuit by:
    causing the current injection unit to inject a first value of current into the diode circuit;
    measuring a first voltage of the diode circuit resulting from the first value of current;
    causing the current injection unit to inject a second value of current into the diode circuit;
    measuring a second voltage of the diode circuit resulting from the second value of current;
    determining a value of the first ΔVbe measurement by calculating a voltage difference between the first voltage and the second voltage; and
    calculating a temperature of the diode circuit based upon the first voltage difference.

11. The apparatus of claim 10, wherein the first value of current is ten microamperes (10 μA) and the second value of current is one hundred microamperes (100 μA).

12. The apparatus of claim 10, wherein the measurement controller is further configured to perform the Vbe measurement of the second temperature or of the third temperature of the diode circuit by:
    causing the current injection unit to inject a third value of current into the diode circuit;
    measuring a third voltage of the diode circuit resulting from the third value of current;
    when performing the Vbe measurement of the second temperature, calculating the second temperature of the diode circuit based upon the third voltage; and
    when performing the Vbe measurement of the third temperature, calculating the third temperature of the diode circuit based upon the third voltage.

13. The apparatus of claim 12, wherein the measurement controller is further configured to perform the second ΔVbe measurement of the second temperature or of the third temperature of the diode circuit by:
    causing the current injection unit to inject a fourth value of current into the diode circuit;
    measuring a fourth voltage of the diode circuit resulting from the fourth value of current;
    determining a value of the second ΔVbe measurement by calculating a voltage difference between the third voltage and the fourth voltage;
    when performing the ΔVbe measurement of the second temperature, calculating the second temperature of the diode circuit based upon the value of the second ΔVbe measurement; and
    when performing the ΔVbe measurement of the third temperature, calculating the third temperature of the diode circuit based upon the value of the second ΔVbe measurement.

14. The apparatus of claim 13, wherein the third value of current is ten microamperes (10 μA) and the fourth value of current is one hundred microamperes (100 μA).

15. A system, comprising:
- a subsystem;
- a diode circuit comprising a transistor thermally coupled to the subsystem;
- a measurement system electrically coupled to the diode circuit; and
- a controller communicatively coupled to the measurement system,
- wherein the measurement system is configured to:
  - perform a first ΔVbe measurement of a first temperature of the diode circuit,
  - communicate to the controller a first measured temperature based upon the first ΔVbe measurement,
  - subsequently perform a first Vbe measurement of a second temperature of the diode circuit,
  - calculate a temperature difference between the second temperature and the first temperature,
  - if the temperature difference between the second temperature and the first temperature is not greater than a predetermined amount, subsequently and repeatedly perform a second Vbe measurement of a third temperature of the diode circuit for as long as a temperature difference between the third temperature and the first temperature is not greater than the predetermined amount,
  - if the temperature difference between the second temperature and the first temperature is greater than the predetermined amount, perform a second ΔVbe measurement of the second temperature of the diode circuit and communicate to the controller a second measured temperature based upon the second ΔVbe measurement, and
  - when a temperature difference between the third temperature and the first temperature is greater than the predetermined amount, perform the second ΔVbe measurement of the third temperature of the diode circuit and communicate to the controller a third measured temperature based upon the second ΔVbe measurement.

16. The system of claim 15, further comprising a temperature control subsystem configured to modify a temperature of the subsystem, wherein the controller is adapted to control the temperature control subsystem based upon one of the first measured temperature, the second measured temperature, and the third measured temperature received from the measurement system.

17. The system of claim 15, wherein the controller is configured to communicate to an external system one of the first measured temperature, the second measured temperature, and the third measured temperature received from the measurement system.

18. The system of claim 15, wherein the measurement system is further configured to perform the first ΔVbe measurement of a first temperature of the diode circuit by:
- injecting a first value of current into the diode circuit;
- measuring a first voltage of the diode circuit resulting from the first value of current;
- injecting a second value of current into the diode circuit;
- measuring a second voltage of the diode circuit resulting from the second value of current;
- determining a value of the first ΔVbe measurement by calculating a voltage difference between the first voltage and the second voltage; and
- calculating a temperature of the diode circuit based upon the first voltage difference.

19. The system of claim 18, wherein the measurement system is further configured to perform the Vbe measurement of the second temperature or of the third temperature of the diode circuit by:
- injecting a third value of current into the diode circuit;
- measuring a third voltage of the diode circuit resulting from the third value of current;
- when performing the Vbe measurement of the second temperature, calculating the second temperature of the diode circuit based upon the third voltage, and
- when performing the Vbe measurement of the third temperature, calculating the third temperature of the diode circuit based upon the third voltage.

20. The system of claim 19, wherein the measurement system is further configured to perform the second ΔVbe measurement of the second temperature or of the third temperature of the diode circuit by:
- injecting a fourth value of current into the diode circuit;
- measuring a fourth voltage of the diode circuit resulting from the fourth value of current;
- determining a value of the second ΔVbe measurement by calculating a voltage difference between the third voltage and the fourth voltage;
- when performing the ΔVbe measurement of the second temperature, calculating the second temperature of the diode circuit based upon the value of the second ΔVbe measurement, and
- when performing the ΔVbe measurement of the third temperature, calculating the third temperature of the diode circuit based upon the value of the second ΔVbe measurement.

* * * * *